United States Patent [19]

Mohamed Ali et al.

[11] Patent Number: 4,949,243
[45] Date of Patent: Aug. 14, 1990

[54] DATA PROCESSING SYSTEM INTENDED FOR THE EXECUTION OF PROGRAMS IN THE FORM OF SEARCH TREES, SO-CALLED OR PARALLEL EXECUTION

[75] Inventors: Khayri A. Mohamed Ali, Stockholm; Lennart E. Fahlén, Bromma, both of Sweden

[73] Assignee: Stiftelsen Institutet För Mikrovågsteknik Vid Tekniska Hög Skolan I Stockholm, Kista, Sweden

[21] Appl. No.: 124,116
[22] PCT Filed: Feb. 24, 1987
[86] PCT No.: PCT/SE87/00090
§ 371 Date: Nov. 2, 1987
§ 102(e) Date: Nov. 2, 1987
[87] PCT Pub. No.: WO87/05418
PCT Pub. Date: Sep. 11, 1987

[30] Foreign Application Priority Data

Mar. 5, 1986 [SE] Sweden ................................ 8601018

[51] Int. Cl.$^5$ ...................... G06F 15/16; G06F 13/00
[52] U.S. Cl. .................................... 364/200; 364/228; 364/243; 364/242.94; 364/931.4; 364/964; 364/927.96
[58] Field of Search ... 364/200 MS File, 900 MS File

[56] References Cited

U.S. PATENT DOCUMENTS

| | | | |
|---|---|---|---|
| 4,368,514 | 1/1983 | Persaud et al. | 364/200 |
| 4,414,624 | 11/1983 | Summer, Jr. et al. | 364/200 |
| 4,493,030 | 1/1985 | Barrett et al. | 364/200 |
| 4,546,432 | 10/1985 | Umemura et al. | 364/200 |
| 4,608,631 | 8/1986 | Stiffler et al. | 364/200 |
| 4,691,280 | 9/1987 | Bennett | 364/200 |
| 4,757,442 | 7/1988 | Sakata | 364/200 |

*Primary Examiner*—Gareth D. Shaw
*Assistant Examiner*—Gopal C. Ray
*Attorney, Agent, or Firm*—Nies, Kurz, Bergert & Tamburro

[57] ABSTRACT

A computer system primarily intended to execute programs, the execution of which can be described in the form of so-called search trees, such as so-called OR Parallel execution, comprising a number of computers or processors and memories. According to the invention, each of the processors (PE0-PE7) can be connected to memory modules (MM0-MM15) via a network (12). The network is capable to connect each processor simultaneously to the write input of a group of memory modules divided for the respective processor, so that the processor in question simultaneously shall be able to write information into the connected group of memory modules, and is capable to connect said processor to the read output of only one memory module in said group. A control member (20) is provided to scan the operation status of the processors (PE0-PE7) and memory modules (MM0-MM15) and is arranged at a pre-determined occasion, such as when a first processor arrives at a division or branching point in said search tree in the executing program, to control said network (12) to connect a second processor, which does not execute, to the read output and write input of one of the memory modules, to the write input of which the first processor had been connected and, thus, fed-in data at the execution all the way to the division or branching point.

9 Claims, 5 Drawing Sheets

DATA PROCESSING SYSTEM INTENDED FOR THE EXECUTION OF PROGRAMS IN THE FORM OF SEARCH TREES, SO-CALLED OR PARALLEL EXECUTION

This invention relates to a data processing computer system intended for the execution of programs in the form of search trees, so-called OR parallel execution.

In recent years several different programming languages and programming structures have been developed, at which the execution order of the programs can be described in the form of a search tree. One example of such is the programming language Prolog (Programming in Logic). Such programs are characterized in that a computer successively searches through an upside-down tree commencing at the root of the tree. For each branch and, respectively, at the branching points of the branch the computer chooses to check one of the branches at each branching point, whereafter it reverses and checks the other branch at the branching point, a.s.o. (and so on). At the execution of such a program, thus, many different branches are to be checked. At a branching point two computers can be allowed to operate in parallel, each of the computers checking one branch. This presupposes, however, that both of the computers comprise memories, which are updated with the information defining the branching point and the data being relevant in the branching point, i.e. so-called environment actual in the branching point. It is obvious, that the information including data constituting the so-called environment of the branching or division point can be very comprehensive.

For being able to executing search trees rapidly, thus, several computers must operate in parallel, each computer executing one branch.

A computer system comprising several computers for carrying out such an execution is described a.o. (among other things) in the article by Y. Sohma, K. Satoh, K. Kumon, H. Masazuwa, A. Itashiki "A New Parallel Interference Mechanism Based on Sequential processing", Proceedings of the Working Conference on Fifth Generation Computer Architecture, Manchester, July 1985.

In the following a computer system of the aforesaid kind is described briefly with reference to FIG. 1 in the accompanying drawings, which Figure shows a system configuration of the known computer system.

The present invention further is described in the following with reference to embodiments shown in the accompanying drawings, in which.

Figure 1:
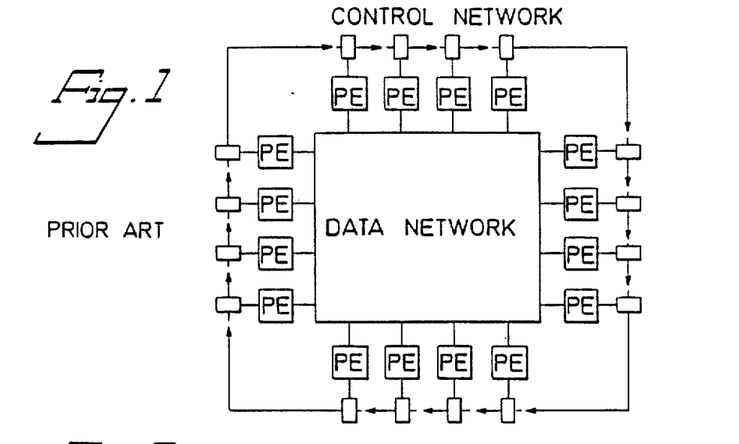

The computer system according to FIG. 1 shows sixteen processors or so-called processing elements (PE). It further comprises a data network, designated "data network", and control network for controlling the different computers PE, designated "control network". Each processor PE is provided with a local memory of its own, which comprises a copy of the program code, and other information required for executing the program. The said control network is intended to emit signals about in the direction of the arrows, in order thereby to indicate the operation status of each processor PE. When a first processor PE is vacant at the same time as a second processor PE has arrived at a division point in a search tree, a signal is emitted via the control network, which signal controls the first processor to start the execution of one of the branches after the division or branching point. When this is to be carried out, the said data network is utilized for copying all necessary information and all data, i.e. the said environment, from the memory of the second processor to the memory of the first processor. Thereafter the two processors execute each its branch in the search tree. This procedure is thereafter repeated when a processor, in its execution of a program, reaches a branching point in the program. Processors having completed the execution of a branch of the program, of course, are released so as to be able to execute another branch.

It takes, however, often an unacceptably long time to transfer actual environment from one processor to another processor in order to update the same, so that the operation can be divided between two processors.

This is the main restriction on the execution time for a program of the aforesaid kind. Not only does it take time to copy actual environment from one processor to another processor, these two processors also are not active in the execution during the time required for the copying.

The present invention solves the aforesaid problem entirely and provides a computer system, which is a very rapid so-called "OR parallel inference machine", by which all advantages with sequential execution are maintained at the same time as the time for dividing the execution work to two or more computers is minimized.

The present invention, thus, relates to a computer system, which is primarily intended for executing programs, the execution of which can be described in the form of a so-called search tree, such as so-called OR Parallel execution, comprising a plurality of computers or processors and memories, and is characterized in that each of the processors can be connected to memory modules via a network, which is capable to connect each processor simultaneously to the writing inlet of a group of memory modules divided for the respective processor in order that the respective processor simultaneously should be capable to write information into the connected group of memory modules, and is capable to connect said processor to only one read output of a memory module in said group, and that a control member is provided to scan the operation status of the processors and memory modules, which control member is capable at a predetermined occasion, for example when a first processor reaches a branching point in said search tree in the program being executed, to control said network to connect a second processor, which does not execute, to the read output and write input of one of the memory modules, to which write input the first processor was connected and thus fed in data at the execution all the way to the division point, and preferably to connect the second processor to at least one additional one write input of said lastmentioned memory modules, provided that two memory modules are available, in order to write into these data during the subsequent execution of the second processor.

In the foregoing, computers or processors have been mentioned. Computers here are understood to be processors provided with all sorts of types of memories, which computers can contain several processor units. Processors are understood to be a simpler form of computers, such as only process units in the form of CPU-units.

Figure 2:
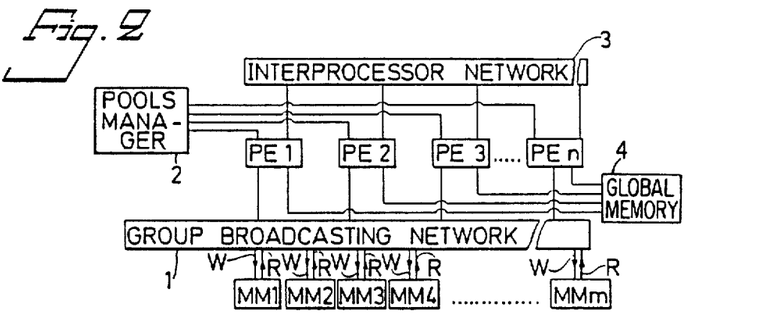
FIG. 2 shows a computer system according to a first embodiment.

In FIG. 2 a computer system according to the invention according to a first embodiment thereof is shown by way of a block diagram. The system comprises a number of processors designated PE1, PE2, PE3 . . . , PEn, which are connected to a number of memory modules designated MM1, MM2, MM3, MM4, . . . MMm. The number of memory modules preferably is greater than the number of processors.

Each processor PE comprises a local memory, which comprises a copy of the actual program code and an interpreter. When the code is a compiled code, no interpreter is provided. The processors can be built-up of any suitable known CPU-unit, for example Motorola MC 68000.

The memory modules can also be of any suitable known type, for example an RAM-memory of 64K.

Furthermore, a first network 1 designated "Group Broadcasting network" GBN is provided. The processors PE are connected to the memory modules MM via the network GBN. The network GBN according to the invention is capable to connect each processor PE simultaneously to a group of memory modules, which connection is made to the write input W of each memory module. The object of this is that a processor PE, which is connected to a group of memory modules MM, simultaneously shall write in information into each of the memory modules MM in the group.

The first network 1 (GBN) further is capable to connect each processor PE to the read output R of only one memory module MM in said group. The network 1 (GBN), thus, is capable to couple, for example, PE1 to a write input W of a group of memory modules MM1, MM2, MM3 and simultaneously couple PE1 only to the read output R of the memory module MM1.

The network 1 (GBN) further is capable to be controlled by means of a control member 2 designated "Pools Manager" PM so as to carry out the coupling of any of the processors PE to any one or more of the memory modules MM.

The control member 2 (PM) consists of a computer or processor capable to control a pool of processors (PE1-PEn) and pool of memory modules (MM1-MMm), and is capable to control the first network 1 (GBN) to carry out different couplings between processors PE and memory modules MM, as well as to start and stop the different processors PE and to scan the operation status of the different processors PE.

Instead of being a special processor, the control member PM can be one or several of the processors PE.

According to the invention, thus, said control member comprises either a special processor 2 or alternatively one or several of the processors PE. Irrespective of the design, the control member is connected to each of the processors PE either directly or indirectly, and is connected to each of the memory modules and to control inputs at said network.

According to the invention, the control member 2 (PM) is capable, when a first processor PE emits a signal to the control member 2 that the processor has reached a division or branching point at the execution of a program in the form of a search tree, to start a second processor, which does not execute, which second processor is arranged to be connected via said network 1 (GBN) to the read output of only one of the memory modules MM, into which the first processor has fed in data at its execution all the way to said division point, and according to a preferred embodiment via the network 1 (GBN) to be connected to at least one additional write input W of said lastmentioned memory modules MM, in order to write data into these memory modules during the subsequent execution.

At each coupling of different processors with different memory modules via the network, the control member 2 emits control signals to the network, which thereby carries out the coupling.

One precondition, however, is that at least two memory modules are available which have been connected to the first processor all the way to the division point, and which can be spared to the second processor.

According to one embodiment, also a second network 3 designated "Interprocessor network" IN is provided, which is connected to each one of the processors PE and capable to constitute a communication channel between the different processors. Through this network two or more processors PE can synchronize one another to start or stop an execution.

According to another embodiment, an additional memory 4 designated "Global Memory" is provided, which is connected to each of the processors PE. Said memory 4 is capable to store information on which processors PE execute and the solutions found by the different processors at the execution. When, for example, a certain number of solutions from a work distributed between different processors is required, in the memory GM is stored which processors are executing. Respective solutions obtained further are stored together with which of the processors has rendered the respective solution to the memory 4 (GM). When the necessary number of solutions has been achieved, pool manager, for example, can send a signal to the processors PE, which still are executing, to stop. When this takes place, the processor or processors, which have stopped, emit a signal to the control member 2 (PM), that the processor in question again is available for executing another part of the program.

Through the memory (GM), thus, the execution is synchronized and rendered more effective. At the simplest embodiment of the invention, however, neither the second network 3 (IN) nor the memory 4 (GM) are required. The memory 4, further, together with the control member 2 can be an integrated unit.

The memory GM need not be a seperate unit, but can consist of one or several of the memory modules or, alternatively, one or several of the local memory of the processors.

At one embodiment an execution of a program, the execution of which can be described in the form of a search tree, proceeds in principle in the way as follows.

The control member 2 PM emits a control signal to a processor PE to start the execution. The processor PE 1 is arranged to be connected via the first network 1 (GBN), for example, to the write input W of all memory modules MM, but only to the read output R of one memory module MM1. When PE1 reaches a branching or division point, PE1 emits a signal to the control member 2 (PM) stating that it has arrived. The control member 2 (PM) selects a vacant processor PE2, to which the control member 2 emits a signal, that PE2 shall be connected, for example, to the write input W of half of the memory modules MM, but not to the memory module MM1, the read output R of which is connected to PE1, and to be connected to the read output R of one of the memory modules connected to PE2. The control member 2 further emits a signal to PE1 to disconnect the connection to the memory modules to be connected to PE2. As PE1 has written information and data into the memory modules, which thereby have been connected to PE2, the so-called environment of the branching point is directly accessible for PE2, which therefore directly can commence to execute a branch after the branching point while PE1 executes the second branch after the branching point. Such a distribution of the execution work can take place at each branching point, and successively an ever increasing number of processors are connected.

When a processor PE is at a branching point, and this had been connected previously only to one memory module, because all memory modules except one have been engaged, the control member 2 is arranged to connect possible vacant memory modules to said lastmentioned processor PE, whereby a copying in known manner of information and data is caused to take place from the memory module containing the environment of the division point to the memory modules just connected.

Thereafter a division of the execution work is carried out as soon as a processor is available, which thereby is connected to the read output on one of the memory modules, in which the environment of the division point is copied. This situation, however, occurs only when a processor has access only to one memory module during the execution and then reaches a branching or division point.

When a processor has completed the execution of one branch, it emits a signal to the control member 2, and when appropriate to the memory 4 (GM), whereby the control member 2 emits a signal to the processor to return the connected memory modules to the pool of memory modules. Thereafter the processor also is included in the pool of processors.

As each processor writes into a group of memory modules, but reads only from one memory module during the execution, the mutual order of read and write operations must be maintained. If this is not the case, invalid data can be read from a memory module. The writing operations, of course, can be allowed to be delayed to all memory modules, except the one from which the actual processor reads.

The control member 2 further is arranged so as in a case when a processor is connected to several memory modules at the same time as only one memory module is available for a processor, which is to commence execution, to disconnect one or several memory modules from said firstmentioned processor and connect it to said lastmentioned processor.

It is entirely apparent from the aforesaid, that the present computer system is especially suitable for executing search tree programs where a plurality of processors simultaneously are in operation along different branches, at the same time as copying of the environment of a division point has been eliminated entirely or substantially entirely. The avoidance of copying implies a dramatically shorter time for executing a program.

This has been rendered possible by the invention, in that, as mentioned above, the computer system is designed so that a processor is connected to the write input of two or more memory modules, but is connected to the read output of only one of these memory modules.

Another problem at computer systems of the kind here referred to is, that reading operations from a memory, such as a memory module, take a relatively long time, due to complex couplings between memory module and processor.

When the number of processors and memory modules is small, for example about ten, said time, however, can be made satisfactorily short. At systems comprising considerably more processors and memory modules, for example one hundred, said time, however, is unsatisfactorily long.

Figure 3:
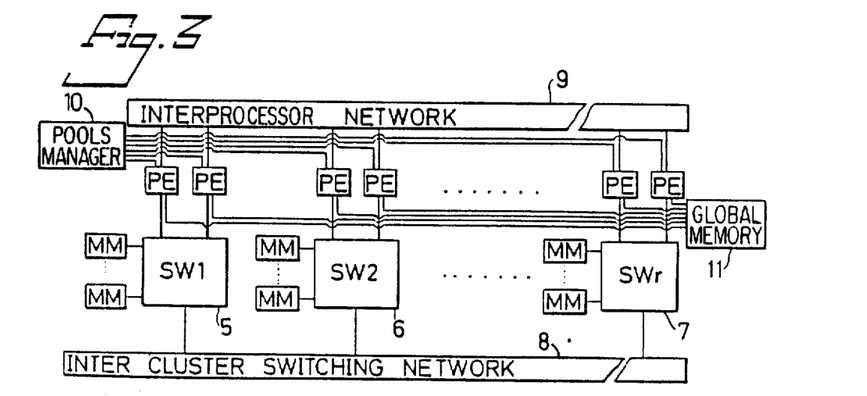
FIG. 3 shows a computer system according to a second embodiment.

According to another embodiment of the present invention, said time is reduced substantially. This embodiment is illustrated in FIG. 3.

According to said embodiment, the computer system comprises a number of combined units, so-called clusters. Each cluster comprises a number of processors PE and a number of memory modules MM, where the processors and memory modules are connected to a third network 5,6,7 (Switching network) SW, of said kind, for each cluster. The number of processors PE and memory modules MM in each cluster shall be relatively small, so that the access time within each such process unit is short with reasonable complexity of the network 5,6,7. The number of memory modules preferably is larger than the number of processors. The network 5,6,7 (SW) corresponds to said first network 1 (GBN) in FIG. 2 and, thus, is capable to connect each processor PE to the write input of two or more memory modules in the same cluster and capable to connect the processor to the read input of only one of these memory modules.

Each network 5,6,7 (SW) according to this embodiment further is capable to control an additional, fourth, common network 8 designated "Intercluster switching network" (ISN) to couple together the network 5,6,7 of one cluster with the network 5,6,7 of another cluster, in order thereby to utilize in other clusters vacant memory modules MM in cases when no vacant memory modules are available in the own cluster.

According to a preferred embodiment, the common network 8 and the network 5,6,7 in each cluster are capable to connect a processor within one cluster with the print input of one or more memory modules in other clusters.

Furthermore, a fifth network 9 designated "Interprocessor network" (IN) is provided, which entirely corresponds to the second network 3 (IN) described with reference to FIG. 2. Analogous to the computer system shown in FIG. 2, a control member 10 designated "Pools Manager" (PM) and a memory 11 designated "Global Memory" (GM) are provided. The mode of operation of the control member 10 corresponds to the one described above with reference to the control member 2 in FIG. 2. The control member 10 in addition stores, which processors PE and which memory modules MM belong to each cluster. In the same way as described above, the control member 10 also stores information on which memory modules are connected to which processors, and which environments are found in each of the memory modules. The control member 10 is capable to control the processors and networks so that a first processor in a first cluster can divide the execution work at a branching or division point with a second processor in a second cluster, provided that the lastmentioned cluster comprises a memory module, into which the first processor has written information and data during its execution all the way to the branching point, i.e. the environment of the or branching point.

When no memory module having actual environment is available, copying yet must be carried out in known manner from the memory module having actual environment to a vacant memory module. An instruction stating that copying shall be carried out is given from the control member 10, which orders copying from a certain memory module to other memory modules. When said other memory modules are located in the same cluster, copying takes place via the network 5,6,7 (SW) within one cluster. When said other memory modules are located in other clusters, copying takes place via networks 5,6,7 (SW) of process units involved and said fourth network 8 (ISN). In order to avoid long access times in a computer system according to FIG. 3, the number of processors and memory modules within a cluster should not be too great.

In each cluster the different processors and memory modules are located very close to each other in order to reduce the signal ways within a cluster.

The especially advantageous feature of the embodiment according to FIG. 3 is, that print operations from one cluster to another cluster via said networks 5,6,7,8 (ISN and SW) can be allowed to take relatively long time, as for example a number of hundred microseconds. It is essential, however, that the write operations are maintained in correct time order. The relatively long time for the write operations does not affect the execution time, because a processor in a process unit always reads from a memory module in the same process unit.

The aforesaid networks 1,3,5,6,7,8,9, i.e. said "Group broadcasting network" (GBN) and said "Interprocessor network" (IN) and "Intercluster switching network" (ISN) and said "Switching network" (SW) can be designed in different ways by known technique. For example, a so-called shuffle-exchange network, a so-called high-speed bus of, for example, optical type, a so-called Multi-Processor-Bus of the type VME or a so-called crossbar connection can be used for said networks. It is further, of course, also possible to utilize traditional points for point connections where the number of processors and memory modules is small.

The essential feature is that the first network 1 (GBN) can couple together all processors with any one or more of the memory modules. This applies correspondingly to said third network 5,6,7 with respect to the processors and memory modules within a cluster. In the case of the second network 3 (IN) and the fifth network 9 it is essential, that they are designed to serve as communication channel and control channel between the different processors. The essential feature concerning the fourth network 8 (ISN) is, that it is designed to serve as communication channel between the internal networks 5,6,7 (SW) of different clusters.

In the following, two other embodiments are briefly described where the structures of networks coupling together different processors or different memory modules with each other are set forth in greater detail.

Figure 4:
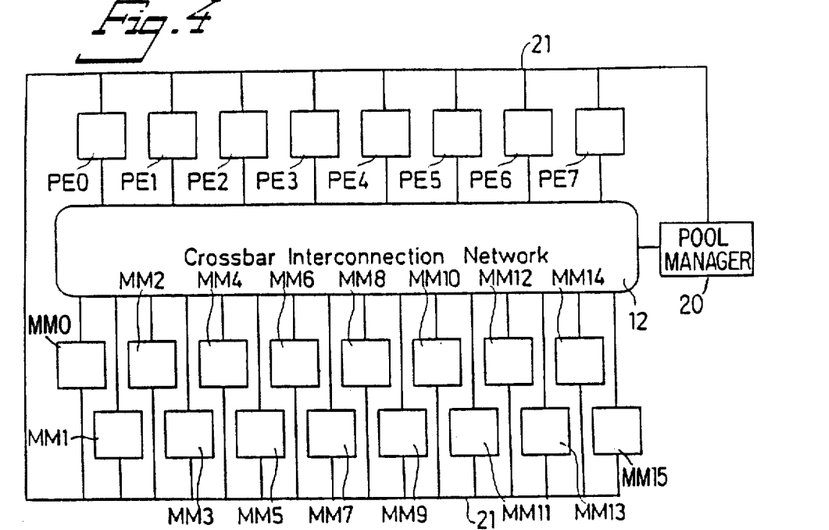
FIG. 4 shows a computer system according to FIG. 2 by way of a simplified block diagram.

In FIG. 4 a computer system substantially according to FIG. 2 is shown by way of a simplified block diagram, where eight processors P0–P7 and sixteen memory modules M0–M15 are connected to a network 12, which is a so-called group Broadcasting network.

The network 12 has two outputs and inputs intended to be connected to the processors P0–P7 and outputs and inputs intended to be connected to the memory modules M0–M15.

Figure 5:
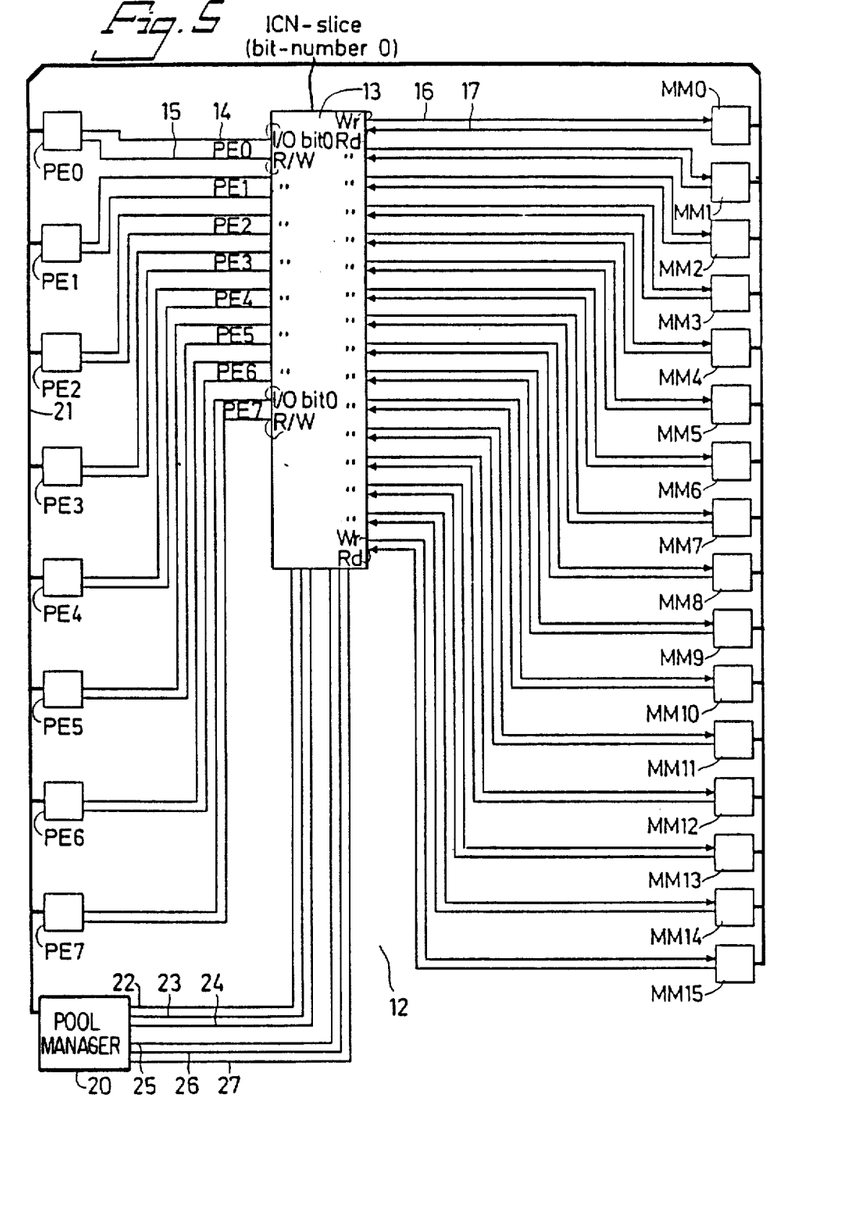
FIG. 5 shows a part of the computer system in FIG. 4 in greater detail.

In FIG. 5 a part 13 of the network 12 in FIG. 4 is shown. The circuit refers to only one bit, and the network 12, therefore, consists of thirty-two parts according to FIG. 5 at a 32-bit address/databus. Each part comprises a circuit 13 (ICN-slice) to connect a bit between different processors PE and memory modules MM. Each processor PE is connected to the circuit 13 via two terminals, of which a first one 14 designated I/O refers to address and data, and a second one 15 designated R/W refers to control of whether a reading (R) or writing (W) operation is referred to. A circuit 13 is shown in detail in FIG. 6. The outputs and inputs I/O are designated by the numeral 14 in FIG. 6 while the numeral 15 designates the control inputs R/W.

Each memory module MM is connected to the circuit 13 by a write input 16 designated Wr and a read output designated Rd.

Figure 6:
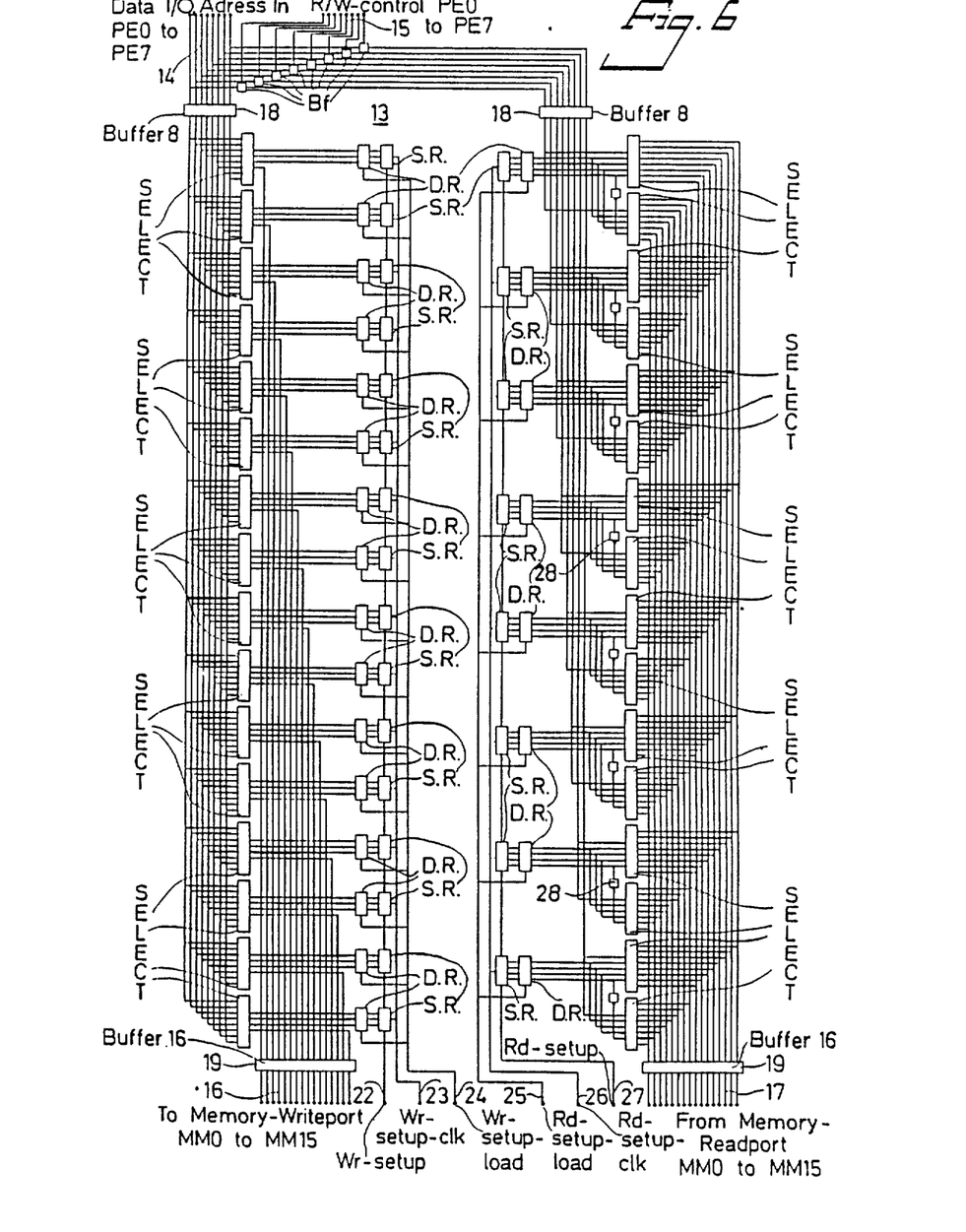
FIG. 6 shows schematically the physical structure of a network according to FIG. 5 in detail.

As concrete components in the circuit 13 the following TTL-circuits can be used. D.R. designates a data register, which can be 74F374. S.R. designates a shift register, which can be 74F299. SELECT designates a selector circuit, which can be 74F251. These circuits are manufactured a.o. by Fairchild Inc., U.S.A.

Buffer circuits, or drive circuits, 18,19 designated Buffer and Bf are provided, which can consist, for example, of the TTL-circuit 7-F244 where the drive circuits 19 consist of two such components.

The said network, thus, comprises a coupling circuit with a number of selectors, which via control inputs are controlled by the control member to couple together different processors with the write input and, respectively, read output of different memory modules. The circuit further is provided with a number of shift registers, in which the control member can store serially a number of data bits, which describe the intended coupling of the circuit between different processors and different memory modules. A number of data registers is provided, to which the control member can control the transfer of information from the shift registers, so that the transfer occurs in parallel. The outputs of the data registers are connected to the selectors, which thus carry out said coupling together.

In FIGS. 4 and 5 also a Pool Manager 20 is indicated, which via a so-called bus 21 is connected to each processor PE and each memory module MM. Said Pool Manager is arranged to control via said bus 21 the processors PE to start and to stop. Via said bus 21 also the operation status of the memory modules MM is synchronized.

The said Pool Manager 20 is connected to each circuit 13 via six control inputs 22–27, of which the control inputs 22–24 are utilized at the coupling of a connection from the processors PE to the write input (Wr) of the memory modules MM, and the control inputs 25–27 are utilized at the coupling of a connection from the read output (Rd) of a memory module MM to a processor PE. The coupling of a circuit 13 proceeds as follows. When, for example, the write input of the memory module MM3 is to be coupled to the processor PE4, the shift registers S.R. are charged serially in that a bit is set up on the input 22, which bit is clocked in by a signal on the input 23, whereafter the next bit is set up and clocked in, a.s.o., until all the fourty-eight bits describing the said coupling of the circuit 13 are fed in. This information thereafter is charged in parallel from the shift registers S.R. over to the data registers D.R. by applying a signal on the input 23. In the data register D.R. corresponding to the memory module MM3 the digit 4 is now found in binary form, which corresponds to processor No. 4 (PE4). The outputs of the data registers D.R. are coupled to the input selector of the selectors (SELECT), and therefore input No. 4 on the selector corresponding to MM3 is coupled to the output on this selector, which output is connected to MM3. The said input No. 4 is connected to PE4. The coupling of a read output (Rd) from a memory module to a processor (PE) proceeds in an analogous way via the control inputs 25-27.

By using data registers D.R. an established coupling can be maintained while a new coupling is fed into the shift registers of the circuits.

The numeral 28 designates inverting circuits of known type, by means of which two "1 of 8"-selectors are caused to act as a selector of the type "1 of 16". A suitable circuit can be 74F04.

The said Pool Manager 20, thus, is capable via said control inputs 22-27 to control which write inputs (Wr) of the memory modules M0-M15 are to be coupled to which processors P0-P7, and from which memory module a certain processor shall read. The network 12, thus, is capable to connect a processor to the write input of one or several memory modules and to connect a processor to the read output of one memory module.

Figure 7:
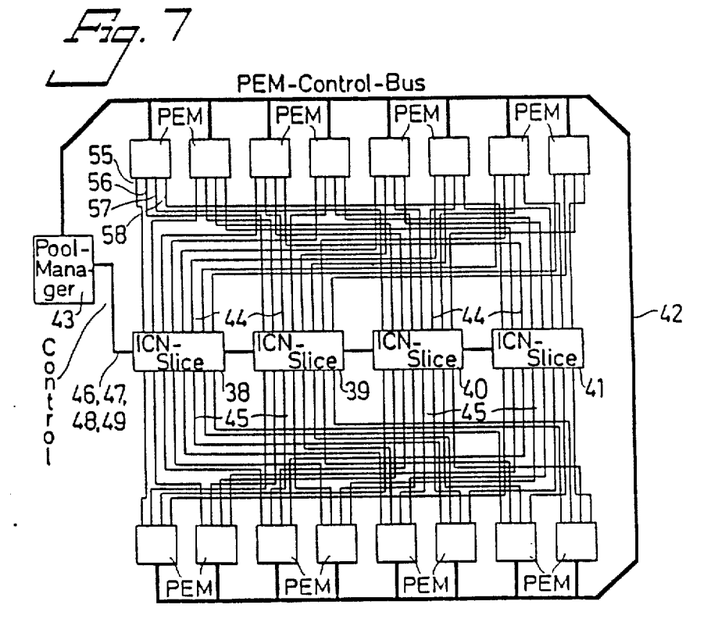
FIG. 7 shows the computer system according to a modified embodiment.
Figures 8, 9:
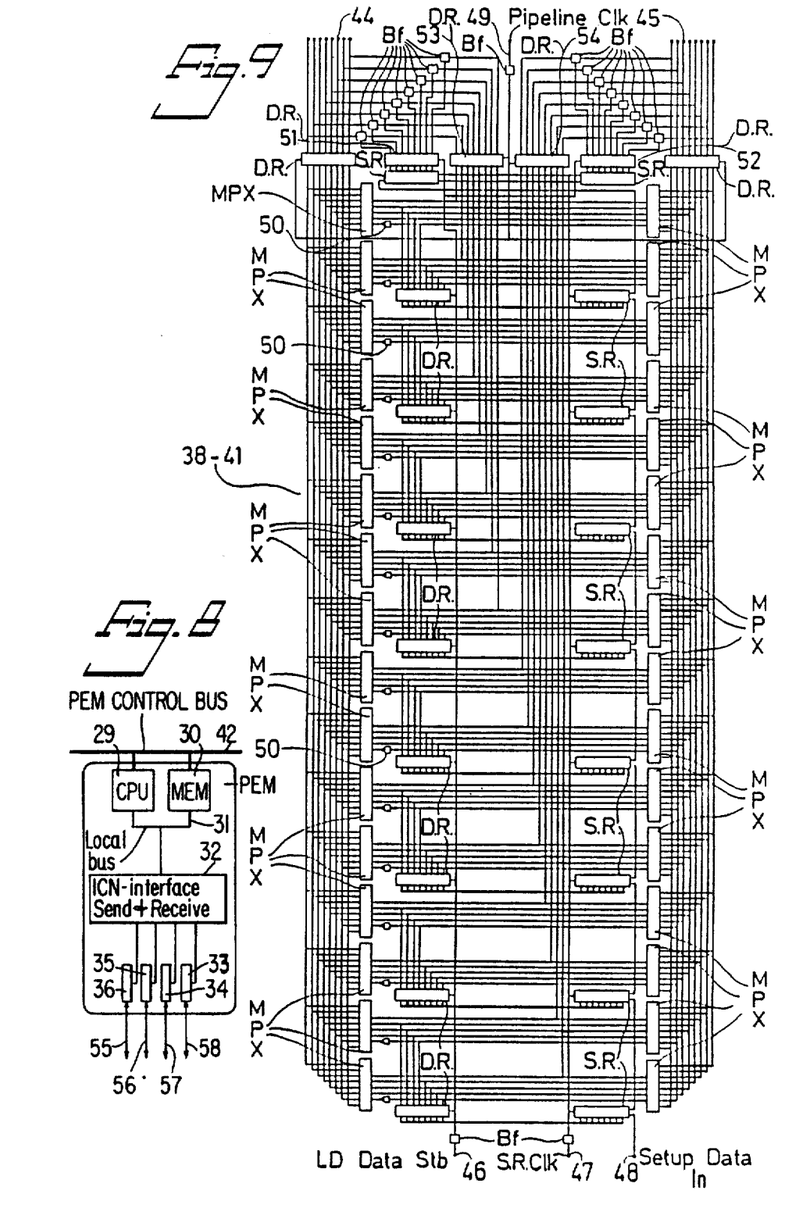
FIG. 8 shows a detail of a processor element (PEM) in FIG. 7.
FIG. 9 shows the physical structure of a network circuit according to FIG. 7 in detail.

It has been mentioned above, that the number of memory modules preferably is greater than the number of processors. The number, however, can be equal. In FIG. 7 an embodiment is shown comprising sixteen processor elements (PEM), each of which comprises a processor and a memory module. In FIG. 8 a processor element PEM is shown in detail, where "CPU" designates the processor 29 and "Memory" designates the memory module 30. Between the processor 29 and memory module 30 a local bus 31 is located, which is connected to a so-called interface 32. To said interface 32 four shift registers 33-36 are connected, which in their turn are connected to a network, which is arranged to connect the different processor elements PEM one with the other via inputs and outputs 55-58 from each shift register 33-36. The network comprises four circuits 38-41 designated "ICN-Slice", one of which is shown in detail in FIG. 9. To each element PEM a control loop 42 designated "PEM-Control-Bus" is connected, which is connected to a Pool Manager 43.

The said Pool Manager 43 is capable via the control loop 42 to control the working status of the processor elements, such as to stop and start the respective processor 29. The control loop 42 has the same function as said bus 21 in FIG. 4.

Each of the circuits 38-41 comprises the components S.R., D.R., B.F., which are exemplified above, and the circuit MPX, which is a selector circuit and can consist of the TTL-circuit 74F251.

The numeral 50 designates inverting circuits corresponding to those inverting circuits designated by 28 in FIG. 6, which circuits can consist of 74F04.

Each of the circuits 38-41 is provided with inputs and outputs 44,45, which are connected to elements PEM, as appears from FIGS. 7 and 9, i.e. with a respective terminal to a respective processor element PEM.

Each of the circuits 38-41 is provided with control inputs 46-48. The respective control input 46;47;48 of each of the circuits 38-41 are coupled in parallel with each other and coupled to said Pool Manager 43. The Pool Manager 43 is capable by these control inputs 46-48 to control actual coupling ways and directions, depending on whether reading and/or writing operations are referred to. An additional terminal 49 constitutes a clock-input (pipe-line-clock) for a global clocking circuit, which can be comprised in said Pool Manager 43. Its function is to clock data through the circuit 38-41 with high frequency, for example 5 MHz-20 MHz, so-called pipe-lining.

This design has the advantage, that the band width of the network can be adapted to the maximum transfer speed, which a processor element PEM can produce at copying from one processor element PEM to another processor element PEM, at the same time as the number of connection lines is substantially smaller than at the embodiment according to FIGS. 4, 5 and 6. The network according to FIG. 7, thus, is a 4-bits so-called ICN crossbar.

The said adaptation is effected by using more or a smaller number of circuits 38-41. When, for example, the maximum transfer speed between two PEM is 40 Mbit/sec and each circuit 38-41 has a band width of 10 Mbit/sec, thus, four circuits 38-41 are required. The circuit 38-41 shown in FIG. 9 has the same function in principle as the afore-described circuit 13 shown in FIG. 6. The circuit 38-41, however, is utilized for up-coupling different processor elements PEM with each other, while the circuits 13 are utilized for up-coupling different processors PE with different memory modules MM.

At the embodiment according to FIG. 7, thus, a certain processor 29 in a certain processor element PEM can be coupled via the network 38-41 to the write input of the memory of one or several of other processor elements. The said certain processors 29 are connected both to the write input and read output of its local memory 30 in the processor element PEM.

When coupling is to be established between a processor unit PEM and another processor unit PEM, the shift registers S.R. are charged in that a bit is set up on the input 48, which bit is clocked in by a clock pulse on the input 47. When the ten shift registers have been charged with a total of 80 bits, these are transferred in parallel to the data registers D.R. by means of a signal on the input 46. The selectors MPX are hereby configurated to connect one of the sixteen inputs and outputs 44,45 with one of the fifteen remaining inputs and outputs 44,45, whereby one PEM is connected with another PEM according to the up-coupling described by the charged 80 bits. The data registers 51,52 are connected to the buffer circuits Bf and control the same. The buffer circuits Bf couple the outputs from the data registers 53,54 to the terminals of the inputs and outputs 44,45 and thereby determine the said terminal to be input or output.

As regards the aforesaid third network 5,6,7 (SW), see FIG. 3, it can be designed according to the embodiments of networks described with reference to FIGS. 5, 6 and, respectively, 7, 9. The said fourth network 8, see FIG. 3, also can be designed in this way.

A number of embodiments of the invention have been described above by way of example. It is obvious, however, that further embodiments can be imagined.

The present invention, therefore, must not be regarded to be restricted to the embodiments set forth above, but the invention can be varied within the scope of the attached claims.

We claim:

1. A computer system intended primarily for executing programs, the execution of which can be described in the form of search trees, also called OR Parallel execution, comprising a number of separate processors and memory modules with write inputs, wherein each of said separate processors (PE1-PEn; PE; PE0-PE7; PEM) is adapted to be connected to memory modules (MM1-MMn; MM; MM0-MM15; PEM) via a network (1; 5-7,8; 12; 38-41), which network is adapted to connect each of said separate processors simultaneously to a group of write inputs (W;Wr) of memory modules designated for the respective processor, so that a processor simultaneously is adapted to write information into the connected group of memory modules, and is adapted to connect said processor to only one read output (R;Rd) of a memory module present in said group, and that a control member (2;10;20;43) is provided to scan the operation status of the processors (PE1-PEn; PE; PE0-PE7; PEM) and memory modules (MM1-MMn; MM; MM0-MM15; PEM), which control member (2;10;20;43) is arranged at a predetermined occasion, such as when a first processor reaches a branching point in said search tree in the executing program, to control said network (1;5-7,8;12;38-41) to connect another processor, which does not execute, to read output (R;Rd) and write input (W;Wr) of one of the memory modules, to the write input of which the first processor had been connected and, thus, fed-in data at the execution all the way to the branching point.

2. A computer system as defined in claim 1, characterized in that the control member (2;10;20;43) is arranged to control said network (1;5-7,8;12;38-41) to connect the second processor to at least one additional one of the write inputs (W;Wr) of an additional one of said last mentioned memory modules, provided that two memory modules are accessible, so as to write into the same data during the subsequent execution of said second processor.

3. A computer system as defined in claim 1 characterized in that said control member comprises at least one processor (2;10;20;43) and is connected to each of said separate processors (PE1-PEn; PE; PE0-PE7; PEM), and each of said memory modules (MM1-MMn; MM; MM0-MM15; PEM), and is connected to control inputs (22-27; 46-48) of said network.

4. A computer system as defined in claim 1, wherein each of said number of separate processors (PE1-PEn; PE; PE0-PE7), comprises a local memory containing a copy of the actual program code, and that separate said memory modules (MM1-MMn; MM; MM0-MM15) comprise a greater number than the number of said separate processors, and the separate processors and said memory modules are connected to said network (1;5-8;12).

5. A computer system as defined in claim 1, characterized in that it comprises a number of processor elements (PEM), each of which comprises a processor (29) and a memory module (30), which processor elements (PEM) are connected to said network (38-41).

6. A computer system as defined in claim 1, characterized in that it comprises two or more so-called clusters comprising a number of processors (PE), a number of memory modules (MM) and said network (5-7), which network (5-7) is arranged to connect different processors (PE) and different memory modules (MM) in a cluster one with the other, that said clusters are interconnected via a common network (8) connected to the network (5-7) associated with each cluster, and that the common network (8) and the network (5-7) in each cluster is adapted to connect a processor (PE) in a cluster to the write input of one or several memory modules (MM) in other clusters.

7. A computer system as defined in claim 1, characterized in that said network (1;5-8;12;38-41) comprises a coupling circuit (13;38-41) comprising a number of selectors (SELECT;MPX), which via said control inputs (22-27;46-48) of the circuit are controlled by said control member (20;43) to couple-up different processors (PE0-PE7;PEM) with the write input and, respectively, different processors with the read output of respective different memory modules (MM0-MM15; PEM).

8. A computer system as defined in claim 7, characterized in that the circuit (13;38-41) is provided with a number of shift registers (S.R), into which the control member (20;43) is arranged to serially store a number of information bits, which describe the intended coupling-up of the circuit (13;38-41) between different processors (PE0-PE7;PEM) and different memory modules (MM0-MM15;PEM), and is provided with a number of data registers (D.R), to which the control member is arranged to control the transfer of information from the shift registers (S.R.), so that the transfer takes place in parallel, which data registers (D.R.) are connected to said selectors (SELECT;MPX).

9. A computer system as defined in claim 4 wherein each local memory also contains an interpreter.

* * * * *